May 19, 1970  F. GRUM ETAL  3,512,895
SPECTROREFLECTROMETRIC REFERENCE STANDARD AND METHOD
Filed Feb. 6, 1967  2 Sheets-Sheet 1

GEORGE W. LUCKEY
FRANC GRUM
GEORGE P. WAUGH
INVENTORS

BY *J. Wm Berkutumus*

ATTORNEY

# United States Patent Office 3,512,895
Patented May 19, 1970

3,512,895
SPECTROREFLECTROMETRIC REFERENCE STANDARD AND METHOD
Franc Grum, George W. Luckey, and George P. Waugh, Rochester, N.Y., assignors to Eastman Kodak Company, Rochester, N.Y., a corporation of New Jersey
Filed Feb. 6, 1967, Ser. No. 614,151
Int. Cl. G01j 1/02
U.S. Cl. 356—243                                2 Claims

ABSTRACT OF THE DISCLOSURE

A combination of high reflectance materials containing carefully prepared barium sulfate; such combination being useful for accurately measuring the reflectance of samples in the range of wavelengths from 200 to 400 nm.; such measurement being most advantageously achieved when comparing the reflectance of samples against a standard as disclosed herein in a light integrating sphere where the sample and the standard are used against a background of high reflectance materials.

---

The art of spectrophotometry is concerned with the accurate determination of the amount of absorption of prepared sample materials at various wavelengths.

Reflectance determinations at the present time are generally achieved by spectrophotometric measurement of samples compared against various reflectance standards. The quality of such measurements are, therefore, directly dependent upon the optical quality of the standard. An ideal standard should, of course, be capable of reflecting as near to 100% of the electromagnetic energy directed against it as possible. Further, the characteristic reflectance of the standard should not vary from one measurement to the next or from one wavelength to another within the range of wavelengths being used. Unfortunately, the currently used materials do not uniformly meet these criteria. The most popular material used today as a reflectance standard, comprises a coating of very pure magnesium oxide. This coating is used both as a standard and as a background in the light integrating sphere of certain model spectrophotometers. When a MgO coating is freshly prepared it is normally capable of giving the high reflectance necessary for accurate measurement. How. However, during use, particularly in the range of wavelengths from about 200 nm. to about 400 nm. MgO coatings quickly deteriorate so badly that reproducible measurements are impossible unless the coatings are renewed fresh prior to each determination and the instrument recalibrated. This undesirable property badly limits the usefulness of such a system and since its use necessitates a time consuming recalibration of the instrument prior to each series of determinations, reproducibility between samples is jeopardized, particularly in the case of fugitive materials.

It is, therefore, an object of this invention to provide by a novel method a reflectance standard for reproducible spectroreflectometric measurements of samples. Such a standard, therefore, must be stable during extended periods of use, not require frequent recalibration of the instrument and should ideally extend the useful range of spectrophotometric determinations into the 200 nm. to 400 nm. range where accurate measurements were previously difficult if not impossible.

It is a further object of this invention to provide a novel method for measuring the reflectance of sample materials by comparison of the reflectance against a stable 100% reflectance standard in combination with a stable highly reflecting matte background.

It has been discovered according to this invention that a suitable reference standard can be prepared by forming plaques comprising a high purity barium sulfate, preferably in combination with a polyvinyl alcohol binder, and that such a standard when used in combination with a similar barium sulfate-containing coating composition used in the spectrophotometer meets the aforementioned requirements. When the paint and plaque are used in combination in a spectrophotometer for the comparative measurement of reflectances of samples the combination produces results of higher accuracy and reproducibility in the range of wavelengths in nanometers from 200 nm. to 2,500 nm. than has previously been possible with currently available magnesium oxide plaques and magnesium oxide or barium sulfate paint or barium sulfate containing-plaques in combination with magnesium oxide-containing paint.

Referring generally to the drawings.

Figure 1:
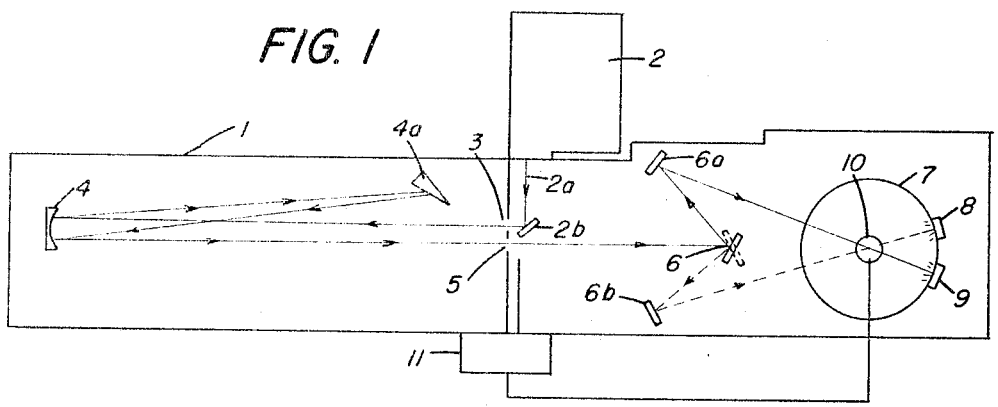
FIG. 1 is a schematic illustration of an instrument for spectroreflectometrically measuring the reflectance of samples against a reference standard in a coated light integrating sphere.
Figure 2:
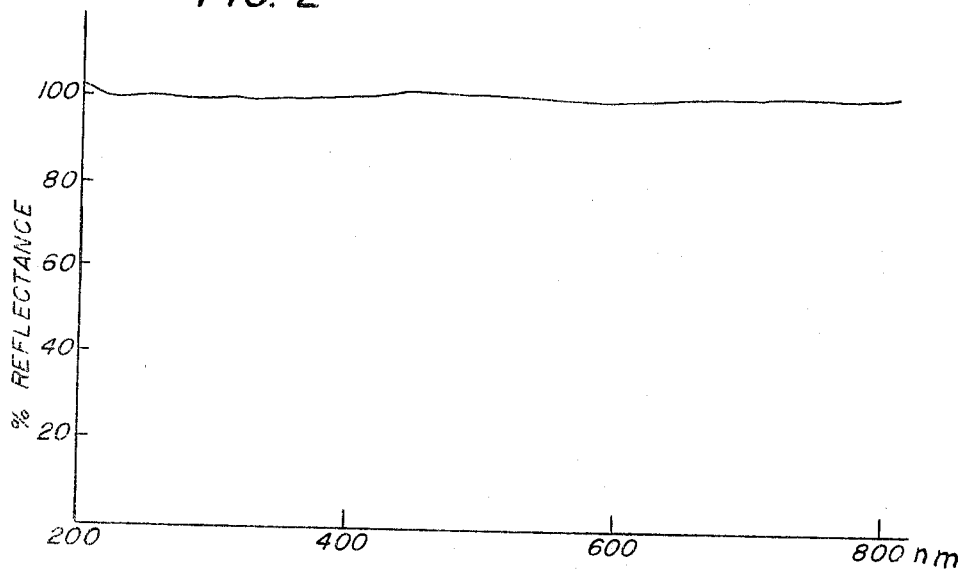
FIG. 2 is a graph of the percentage reflectance of the barium sulfate-containing plaque used as standard in this invention.

Referring now specifically to the drawings:

FIG. 1 illustrates a monochromator housing 1 of the reflectance comparing unit wherein a radiant energy source 2 originates a beam 2A which is reflected from a mirror 2B through an entrance slit 3 where it is again reflected from a mirror 4 to dispersing prism 4A back to collimating mirror 4 and then through an exit slit 5 to a beam chopper 6. The beam chopper 6 alternately splits or chops the beam and the two components illustrated. One of the components is reflected from mirror 6A into an integrating sphere 7 in line with and onto a sample positioned at sample port 9. Beam chopper 6 distributes the second beam to mirror 6B which reflects the beam into integrating sphere 7 in line with and onto a reference positioned at reference port 8. The energy reflected from the materials positioned at reference port 8 and sample port 9 respectively are alternately compared by a detector 10, which may be a photomultiplier tube, photoelectric cell or the like. The signals are then compared in some appropriate manner such as by graphically on a recorder (not shown). In operation, a spectroreflectometric determination depends on the total energy impinging upon detector 10. Normally the energy level is held constant by providing exit slit 5 with a variable aperture whose size is changed by aperture control means 11 which controls the size of the aperture at exit slit 5 by being responsive to the energy received by detector 10. In this manner when the total energy reflected from all points of the light integrating sphere 7, diminishes due to deterioration of the internal coating the sphere 7 or from deterioration of the reference standard, detector 10 will respond by signaling aperture control means 11 which changes the aperture of exit slit 5 to increase the amount of total energy entering the integrating sphere 7 so as to maintain the relative differences in reflectances between the reference standard and the sample to be compared. It can be seen from this type of instrumental setup that a deterioration in either the coating for sphere 7 or the reference standard at reference port 8 will increase the aperture at exit slit 5 thereby decreasing the effective resolution of the instrument, particularly in the shorter wavelengths. Specifically, reflectances in the wavelengths between 200 and 400 nm. cannot be accurately resolved in the quantitative determination of the reflectance properties of a wide variety of materials due to this reduction in the total reflected radiant energy within the instrument. It is this weakness in the instrument which necessitates frequent renewal of the coating for the inside of integrating sphere 7 and renewal of the reference plaque at reference port 8. Such changes must, of course, be accompanied by recalibration of the instrument. Thus the deterioration of the standard plaque or of the coating of the sphere, diminishes the useful wavelength range of the instrument.

Figure 3:
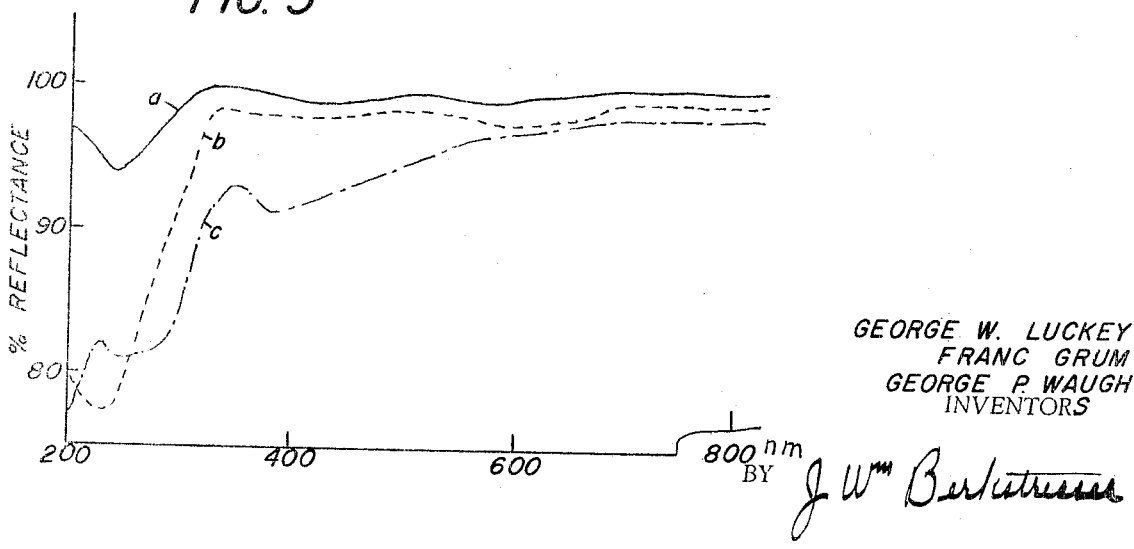
FIG. 3 is a graph of the percentage of reflectance of the currently used reflectance standard containing magnesium oxide, (a) freshly prepared, (b) two days old, and (c) 11 weeks old.

The frequency with which an instrument must be recalibrated can be determined roughly by reference to FIG. 3. The curves in FIG. 3 clearly show that magnesium oxide loses the desired reflectance response in a relatively short period of time in the critical portions of the spectrum between 200 and 400 nm. As the magnesium oxide deteriorates, the resolution of the reflectance from samples measured in this region of wavelengths is severely restricted.

Figure 4:
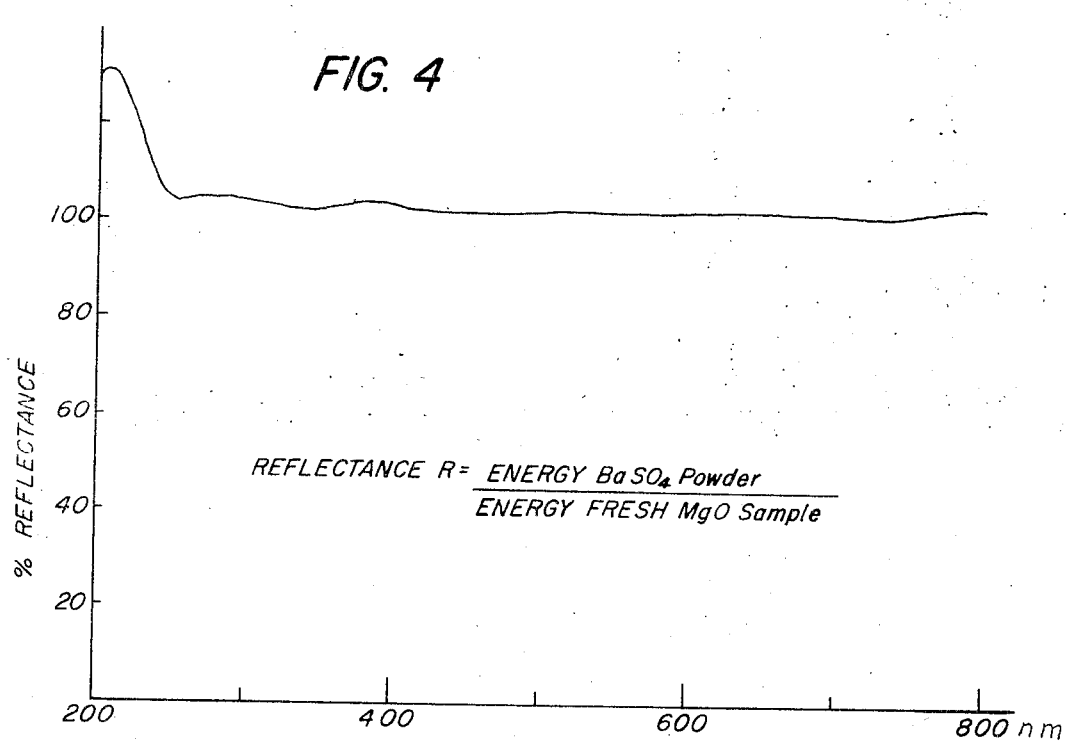
FIG. 4 is a graph of the percentage of reflectance of a barium sulfate-containing plaque according to this invention when compared with a standard of freshly prepared magnesium oxide.
Figure 5:
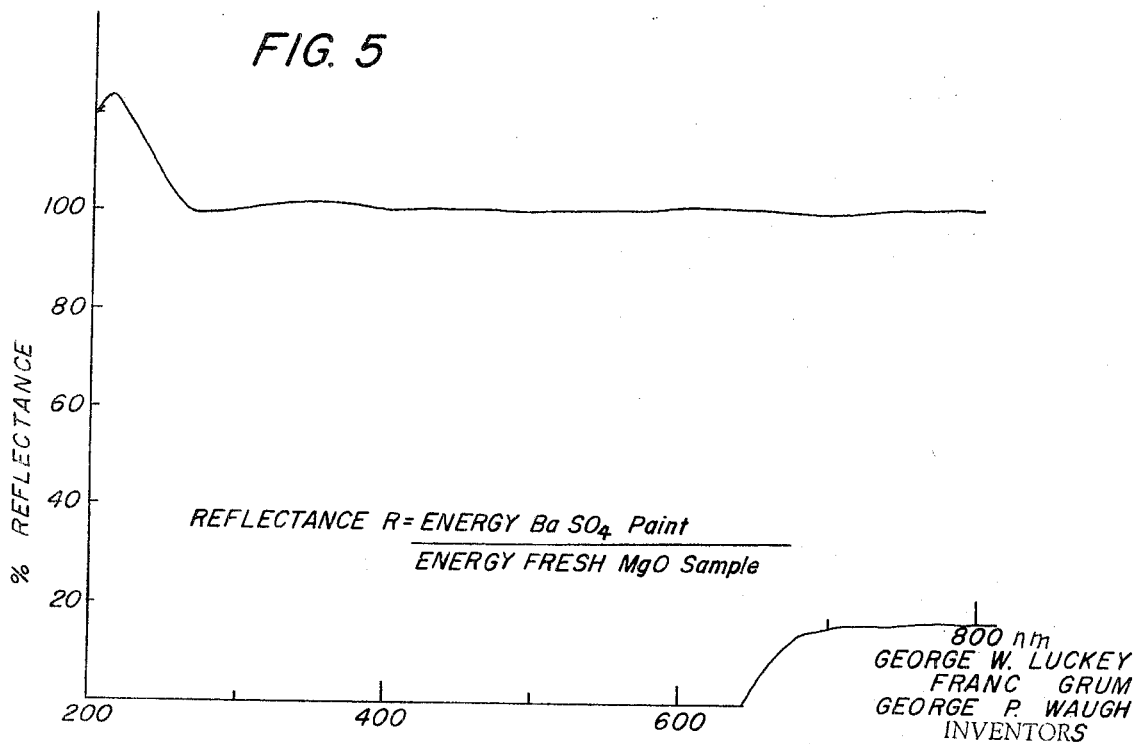
FIG. 5 is a graph of the percentage of reflectance of a barium sulfate-containing paint coating composition according to this invention compared against a coating containing freshly prepared magnesium oxide.

The useful range of the instrument designed for 2,500 nm. down to 200 nm. will not be restricted by the use of barium sulfate-containing reference standard prepared according to this invention when used in an integrating sphere, such as integrating sphere 7, FIG. 1 of the drawings, which has been coated with a preparation comprising a similar high reflectance barium sulfate-containing material. The reflectance characteristics of these materials as further described herein can be more fully appreciated by referring to FIGS. 4 and 5 of the drawings. These figures clearly show that the reflectance of the barium sulfate-containing materials is greater in the critical wavelengths below about 400 nm. particularly below 300 nm. than the previous standard, i.e., freshly prepared magnesium oxide (FIG. 3).

The barium sulfate of this invention is typically prepared by forming a precipitate of the salt during the simultaneous addition of solutions of reagent grade reactants. One solution contains barium chloride and the other sodium chloride with sulfuric acid. These solutions are added to a solution of sulfuric acid and sodium chloride. During the resultant precipitation of the barium sulfate the reaction mixture is held above about 50° C. and the pH of the reaction mixture is maintained in a range below about 2. This procedure minimizes contamination from impurities having absorption in the wavelength regions between 2,500 and 200 nm. It is generally preferable that less than five parts per million of such precipitates be present in the barium sulfate. By the use of the double jet method of precipitation, the particle size in the precipitate formed is generally in the region of about 3 microns to about 0.05 micron. Normal washing procedures for the precipitate, with distilled water, and vacuum drying above 100° C. produces a barium sulfate which is suitable for use as a standard according to this invention. Techniques for double jet precipitation of barium sulfate as disclosed herein are known in the art, for example, U.S. Pat. No. 2,358,050.

In preparing the standard reflectance plaques and coatings utilizing barium sulfate, it has been discovered that a barium sulfate powder containing a moisture content of from about 0.5% to about 7% water can be admixed with polyvinyl alcohol in varying proportions preparatory to producing either a plaque or a coating composition. Polyvinyl alcohol prepared by a continuous method similar to that in U.S. 2,642,419 and U.S. 2,643,994, with properties similar to the material described in Example 22 of U.S. 2,642,420 is of particular value when combined with the high reflectance barium sulfate of this invention. When barium sulfate is used in formulations containing from about 100 to about 500 parts by weight of barium sulfate to one part of such a polyvinyl alcohol, the coating composition and plaque which are responsible for the unusually high accuracy reflectance measurements described herein can be prepared. In particular, a suitable coating composition can be compounded by using about 150 parts of barium sulfate to about one part of polyvinyl alcohol and by dispersing in a selected amount of a suitable solvent to produce a coating composition of the desired consistency for coating. Such a composition can be applied to the interior of an integrating sphere by any suitable technique such as by spraying, bulk coating, brush application, and the like. Likewise, a composition comprising barium sulfate having a moisture content hereinbefore described can be compounded with polyvinyl alcohol in a weight ratio of more than about 100 parts of barium sulfate to one part of polyvinyl alcohol and the resulting composition pressed in a suitable compression device to a density in the range of 2 to 4 grams per cm.$^3$ to produce a substantially perfect matte finish plaque having a reflectance in the range of wavelengths from about 200 to 2,500 nm.

The invention will be more fully described in the following examples.

EXAMPLE 1

A barium sulfate powder was formed in the following manner. Sufficient reagent grade barium chloride dihydrate, was dissolved in distilled water to make a 1.35 molar solution. This solution was set aside for 2 hours, before 925 ml. of it were decanted into a calibrated flask and diluted with enough distilled water to make 5 liters (solution A). The dilute solution was then heated to 70° C. Enough reagent grade sodium chloride was dissolved in distilled water to make a 3 molar solution. This solution was also set aside for 2 hours. Another solution was then prepared by mixing 417 ml. of 3 molar sulfuric acid (prepared from reagent grade sulfuric acid and distilled water) and 400 ml. of decanted 3 molar sodium chloride with sufficient distilled water to make 5 liters of solution (solution B). This solution was also heated to 70° C. The two solutions were then added simultaneously at a rate of 333 ml. per minute into a third solution which had been prepared by mixing 200 ml. of 3 molar sulfuric acid solution and 200 ml. of 3 molar sodium chloride solution with sufficient water to make 4 liters. This latter solution had been previously heated to the boiling point before starting the reaction by the addition of the other two solutions. During the reaction the solution was thoroughly agitated with a stirrer. At the conclusion of the reaction the supernatant liquid was poured off and the precipitate washed four times by decantation with cold distilled water. The precipitate was collected on a suction filter and dried at 120° C. in a vacuum oven. The dried powder was pressed in a receptacle, 1.375 inches in diameter and ⅜ of an inch deep and then compared with a freshly prepared magnesium oxide surface in a Beckman DK-2A spectrophotometer. The results of these tests are summarized in Table I.

TABLE I

| Wavelength in nm | 700 | 600 | 500 | 400 | 300 | 250 |
|---|---|---|---|---|---|---|
| Reflectance increase relative to fresh MgO, percent | 1.8 | 1.4 | 1.2 | 2.5 | 4.1 | 5.3 |

EXAMPLE 2

A 1.35 molar solution of barium chloride was prepared as described in Example 1. A 925 ml. portion of this solution was then diluted with sufficient distilled water to make 5 liters of solution A which were then heated to 70° C. Five liters of sulfuric acid-sodium chloride solution B were prepared as described in Example 1 and were heated to 70° C. The two solutions were then added simultaneously at a rate of 333 ml. of each/minute to a solution previously prepared by mixing 800 ml. of 3 M sulfuric acid solution and 200 ml. of 3 M sodium chloride solution with sufficient distilled water to make 4 liters. This solution was preheated to its boiling point before starting the reaction as described in Example 1. At the conclusion of the reaction, the precipitate was washed, collected, dried, pressed into a receptacle and compared with a freshly prepared MgO surface in a Beckman DK–2A Spectrophotometer as in Example 1. The results of these tests are summarized in Table II.

TABLE II

| Wavelength in nm | 700 | 600 | 500 | 400 | 300 | 250 |
|---|---|---|---|---|---|---|
| Reflectance increase relative to fresh MgO, percent | 1.2 | 1.0 | 1.2 | 1.9 | 5.2 | 7.0 |

EXAMPLE 3

Example 1 was repeated, with the modification that the solutions A and B were added to the solution C at a rate of 833 ml. of each per minute. The precipitate was washed, collected, and dried as described in Example 1. The dried powder was pressed into a receptacle and compared with a freshly prepared MgO surface in a Beckman DK–2A Spectrophotometer as in Example 1. The results of this test are summarized in Table III.

TABLE III

| Wavelength in nm | 700 | 600 | 500 | 400 | 300 | 250 |
|---|---|---|---|---|---|---|
| Reflectance increase relative to fresh MgO, percent | 1.8 | 1.4 | 1.2 | 2.5 | 4.5 | 6.0 |

The barium sulfate powder in the receptacle and the magnesium oxide were then exposed for 24 hours to the radiation from a 6000 watt Osram Xenon arc lamp at a distance of 1.5 feet. The reflectances of the two coatings after exposure are summarized in Table IV.

TABLE IV

| Wavelength in nm | 700 | 600 | 500 | 400 | 300 | 250 |
|---|---|---|---|---|---|---|
| Reflectance decrease relative to fresh BaSO$_4$ for: | | | | | | |
| MgO after exposure, percent | −0.4 | −0.4 | −0.6 | −0.8 | −2.0 | −4.0 |
| BaSO$_4$ after exposure, percent | −0 | −0 | −0 | −0 | −0.8 | −1.5 |

The results in this table show that the barium sulfate is more stable than magnesium oxide when exposed to the Osram Xenon arc. The exposed magnesium oxide layer was stored in the dark at 73° F. and at a relative humidity of 45% for 10 days. After this storage, the percent decreases in reflectances shown in Table V were obtained. The exposed barium sulfate pressing was kept under the same conditions for 110 days. The percent decreases in reflectances after this storage are also shown in Table V.

TABLE V

| Wavelength in nm | 225 | 250 | 300 | 400 | 500 | 600 |
|---|---|---|---|---|---|---|
| Magnesium oxide (10 days), percent | −8.0 | −2.0 | −1.0 | −0.4 | −0.3 | −0.2 |
| Barium sulfate (110 days), percent | −0.9 | −0.8 | −0.6 | −0.4 | −0.3 | −0.2 |

The results in this table show that the barium sulfate pressing is more stable than the magnesium oxide layer when stored under ambient conditions.

EXAMPLE 4

A 1.155 M solution of barium chloride was prepared as described in Example 1. Then 1080 ml. of this solution was filtered and diluted with distilled water to make 5 liters and heated to a temperature of 70° C. Another solution was prepared by mixing 417 ml. of 3 M sulfuric acid with sufficient distilled water to make 5 liters of solution. This solution was also heated to a temperature of 70° C. The two solutions were then added simultaneously at a rate of 333 ml./min. to a solution prepared by mixing 400 ml. of the 3 M sulfuric acid solution with sufficient distilled water to make 4 liters. This solution was preheated to its boiling point before starting the reaction in a 22-liter round bottom flask, in the manner described in Example 1. The product was washed, collected, and dried as described in Example 1. The whole procedure was then repeated with the exception that the precipitate was washed once with hot water before the usual washing. When the dried powders were placed in receptacles and tested as described in Example 1, the results summarized in Table VI were obtained.

TABLE VI

| Wavelength in nm | 700 | 600 | 500 | 400 | 300 | 250 | 225 |
|---|---|---|---|---|---|---|---|
| Reflectance increase relative to fresh MgO, in percent: | | | | | | | |
| Sample No. 1 | 2.0 | 1.6 | 1.8 | 2.7 | 6.4 | 7.6 | 31.3 |
| Sample No. 2 (hot water) | 2.1 | 1.6 | 1.8 | 2.9 | 6.5 | 8.2 | 31.9 |

A 1.155 M solution of barium chloride was prepared as described in Example 1. Then 1080 ml. of this solution were filtered and diluted with distilled water to make 5 liters and heated to a temperature of 70° C. A second solution was prepared by mixing 417 ml. of 3 M sulfuric acid and 250 ml. of 3 M sodium chloride solution with sufficient distilled water to make 5 liters of solution. This solution was also heated to a temperature of 70° C. The two solutions were then added simultaneously at a rate of 333 ml./min. to a third solution prepared by mixing 400 ml. of the 3 M sulfuric acid solution with 100 ml. of sodium chloride solution and sufficient water to make 4 liters. This solution was preheated to its boiling point before starting the reaction in a 22-liter round bottom flask in the manner described in Example 1. The product was washed, collected, and dried as described in Example 1. This procedure was repeated with 500 ml. of sodium chloride solution in the second solution and 200 ml. of sodium chloride solution in the third solution. It was repeated with 125 ml. of sodium chloride solution in the second solution and 50 ml. of sodium chloride solution in the third solution. It was again repeated with 62.5 ml. of sodium chloride solution in the second solution and 25 ml. of sodium chloride solution in the third solution. When the dried powders were placed in the receptacle and tested as described in Example 1, the results summarized in Table VII were obtained.

TABLE VII

| Wavelength in nm | 700 | 600 | 500 | 400 | 300 | 250 | 225 |
|---|---|---|---|---|---|---|---|
| Reflectance increase relative to fresh MgO in percent for: | | | | | | | |
| 250/100 NaCl | 2.3 | 1.6 | 2.2 | 3.4 | 6.8 | 8.3 | 32.3 |
| 500/200 NaCl | 2.2 | 1.6 | 2.0 | 2.6 | 6.3 | 7.7 | 31.5 |
| 12/50 NaCl | 2.1 | 1.5 | 2.0 | 2.8 | 6.4 | 8.2 | 32.4 |
| 62.5/25 NaCl | 1.9 | 1.5 | 2.0 | 2.6 | 6.6 | 8.2 | 32.3 |

After making these measurements, the samples of powder were placed 1.5 feet from a 6000 watt Osram Xenon arc clamp and exposed for 48 hours. After exposure, the reflectances of the samples were measured as before. The results are summarized in Table VIII.

TABLE VIII

| Wavelength in nm | 700 | 600 | 500 | 400 | 300 | 250 | 225 |
|---|---|---|---|---|---|---|---|
| Reflectance increase relative to fresh MgO in percent for: | | | | | | | |
| 0/0 NaCl No. 1 | 2.0 | 1.5 | 1.8 | 2.8 | 4.2 | 2.6 | 21.8 |
| 0/0 NaCl No. 2 | 2.1 | 1.6 | 1.8 | 2.8 | 4.3 | 1.7 | 20.4 |
| 250/100 NaCl | 2.2 | 1.5 | 2.1 | 2.8 | 5.1 | 4.7 | 26.5 |
| 500/200 NaCl | 2.2 | 1.6 | 1.9 | 2.6 | 4.6 | 4.5 | 26.4 |
| 125/50 NaCl | 2.2 | 1.6 | 1.8 | 2.7 | 4.5 | 4.8 | 26.5 |
| 62.5/25 NaCl | 2.0 | 1.7 | 1.8 | 2.7 | 4.8 | 4.8 | 26.9 |

The data in these tables show that the presence of sodium chloride in the reaction mixture increases the stability of the barium sulfate in the ultraviolet region of the spectrum. The infrared reflectances of these barium sulfate samples were compared with that of thermally deposited magnesium oxide. This comparison is shown in Table IX. The samples were not exposed to the Xenon arc lamp before making the measurements.

TABLE IX (NEAR INFRARED REFLECTANCE)

| Wavelength in nm | 2,400 | 2,200 | 2,000 | 1,800 | 1,600 | 1,400 | 1,200 | 1,000 | 800 |
|---|---|---|---|---|---|---|---|---|---|
| Reflectance relative to fresh MgO in percent for: | | | | | | | | | |
| 0/0 NaCl No. 1 | 85.0 | 90.1 | 86.3 | 96.3 | 97.8 | 97.7 | 100.5 | 100.9 | 100.9 |
| 250/100 NaCl No. 2 | 92.2 | 95.0 | 91.8 | 99.1 | 100.1 | 99.9 | 102.2 | 102.5 | 102.5 |
| 500/200 NaCl No. 3 | 92.3 | 95.0 | 91.8 | 99.0 | 100.1 | 99.8 | 101.9 | 102.4 | 102.4 |

Satisfactory barium sulfate powders have been made with a wide range of concentrations of sulfuric acid in the reactor. The concentrations of acid should be selected to yield a product with grain sizes in the range from 0.05 to 3 microns. Powders which have grains larger than this range have poorer reflectances, although the values are still greater than those of MgO in some regions of the ultraviolet spectrum. Powders with grain sizes smaller than 0.05 micron have good reflectances when dry, but they are difficult to wash thoroughly and they are sensitive to changes in the relative humidity of their surroundings. Powders with good reflectance characteristics have been obtained with a range of sodium chloride concentrations from 0.015 M to 0.15 M in the reaction solution. The best results are obtained with about 0.075 M NaCl present during the reaction. Barium sulfate pigmented plaques and coating compositions preferred for conjoined use in the present invention can be prepared according to the following examples.

EXAMPLE 5

Barium sulfate powder (100 grams) prepared by the methods described in Example 1 was milled with 65 ml. of 3A ethanol in a glass mortar. Then 35 ml. of distilled water and 20 ml. of a 5% solution of polyvinyl alcohol in water were added and the mixture was thoroughly stirred. After stirring, the mixture was coated on a grained aluminum sheet at a coverage of 0.040″ wet thickness and dried at room temperature. Another sample of the mixture was placed in a spray gun (De Vilbliss spray gun type MBC, nozzle No. 30 at 45–60 p.s.i. air pressure) and sprayed onto a steel hemisphere which had been previously coated with a layer of a suitable material (flat white paint) for adhesion of the coating to the steel. Three coats were applied allowing 10 min. drying between coatings in a well-ventilated booth. The polyvinyl alcohol used in making this dispersion was prepared by the following method: A 30 percent solution of medium viscosity poly(vinyl acetate) in wet methanol (containing 7.6 percent water by weight) was mixed with one-tenth its volume of a 10 percent solution of sodium hydroxide in methanol. The gel which soon formed was presently cut into small pieces (¼ to ½ inch). These were soaked in water, washed in more water, soaked in 0.2 N sodium hydroxide overnight, further washed in water, soaked overnight in 1 N hydrochloric acid, and washed in distilled water until neutral. The reflectance of these coatings was compared with that of a freshly prepared magnesium oxide surface in a Beckman DK-2A spectrophotometer.

TABLE X

| Wavelength in nm | 800 | 700 | 600 | 500 | 400 | 300 | 250 | 225 |
|---|---|---|---|---|---|---|---|---|
| Reflectance increase relative to fresh MgO, percent | 1.2 | 0.9 | 0.5 | 0.6 | 0.8 | 1.0 | 1.0 | 15.0 |

After making these measurements, the coating an aluminum foil was placed 1.5 feet from a 6000 watt Osram-Xenon arc lamp and exposed for 24 hours. A sample of barium sulfate powder prepared in a manner similar to that described in Example 1, and a sample of magnesium oxide prepared by the method of thermal deposition were placed adjacent to the coating during the exposure. The reflectances of these samples after exposure were measured as before and the results are summarized in Table XI.

TABLE XI

| Wavelength in nm | 700 | 600 | 500 | 400 | 300 | 250 | 225 |
|---|---|---|---|---|---|---|---|
| Decrease in reflectance BaSO₄ coating | 0.2 | 0.1 | 0.1 | 0 | 0.4 | 0.2 | 0 |
| Fresh MgO | 0.2 | 0.2 | 0.4 | 0.2 | 2.0 | 5.7 | 6.0 |
| BaSO₄ powder | 0 | 0 | 0 | −0.1 | −2.0 | −4.0 | −6.2 |

When plaques containing barium sulfate pigment prepared in a manner similar to Example 1 were formed from compositions containing one part by weight of polyvinyl alcohol, as in Example 5, and 100 to 200 parts by weight of barium sulfate containing about 0.5% to about 7% by weight of water, the preferred mode of formation was under about 3000 to 4000 p.s.i.g. The preferred density of the compacted material ranged from about 2 to about 4 grams per cubic cm. This density also provides the reference plaque with the most desirable mechanical strength although high reflectance material can be produced according to this invention having less desirable properties by using ratios and densities outside of the preferred range.

The invention disclosed hereinbefore has been described in detail with particular reference to preferred embodiments thereof, however, it should be understood that variations and modifications can be effected in the practice of this invention which are within the spirit and scope of the invention as described hereinabove and as further defined in the appended claims.

We claim:
1. A reflectance system for comparing the reflectance of samples in the wavelength range from about 200 nm. to about 2,500 nm. comprising in combination, a pressed powder plaque having a density of from about 2 to about 4 grams per cm.³ and pressed from barium sulfate granules having a moisture content of from about 0.5% to about 7% by weight and a range of sizes of about 0.05 micron to about 3 microns; said plaque being suitable for comparative use with a sample whose reflectance is sought in the range of wavelengths from about 200 nm. to about 2,500 nm., and a substantially uniformly internally coated integrating sphere, said coating consisting essentially of a barium-sulfate-containing paint mixture comprising barium sulfate granules having a range of sizes from about 0.05 micron to about 3 microns mixed together with a polymeric resin binder containing a solvent medium; wherein the polymeric resin binder is used in the proportion of one part of binder to more than about 100 parts by weight of barium sulfate.

2. A reflectance standard for comparing the reflectance of samples in the wavelength range from about 200 nm. to about 2,500 nm. comprising a pressed plaque having a density of from about 2 to about 4 grams per cm.³ pressed from a mixture of barium sulfate and polyvinyl alcohol, said mixture containing one part of polyvinyl alcohol and about 100 to about 500 parts of barium sulfate, having a range of sizes of about 0.05 micron to about 3 microns and having a moisture content during pressing of from about 0.05% to about 7% by weight of the barium sulfate.

References Cited

UNITED STATES PATENTS

| | | |
|---|---|---|
| 2,347,066 | 4/1944 | Shurlliff. |
| 2,347,067 | 4/1944 | Shurlliff. |
| 2,482,598 | 9/1949 | Roos. |
| 2,686,452 | 8/1954 | Bentley. |
| 3,205,355 | 9/1965 | Ghlert. |
| 3,234,846 | 2/1966 | Cropper et al. |

RONALD L. WILBERT, Primary Examiner

W. A. SKLAR, Assistant Examiner

U.S. Cl. X.R.

250—228